Nov. 18, 1969   H. F. BOK   3,478,720
SEALED SPRAYER AND BAFFLE COMBINATION FOR A
SPRAY-COATING ENVIRONMENT
Filed Feb. 20, 1969   2 Sheets-Sheet 1

INVENTOR
HENDRIK F. BOK

BY  *Semmes and Semmes*
ATTORNEYS

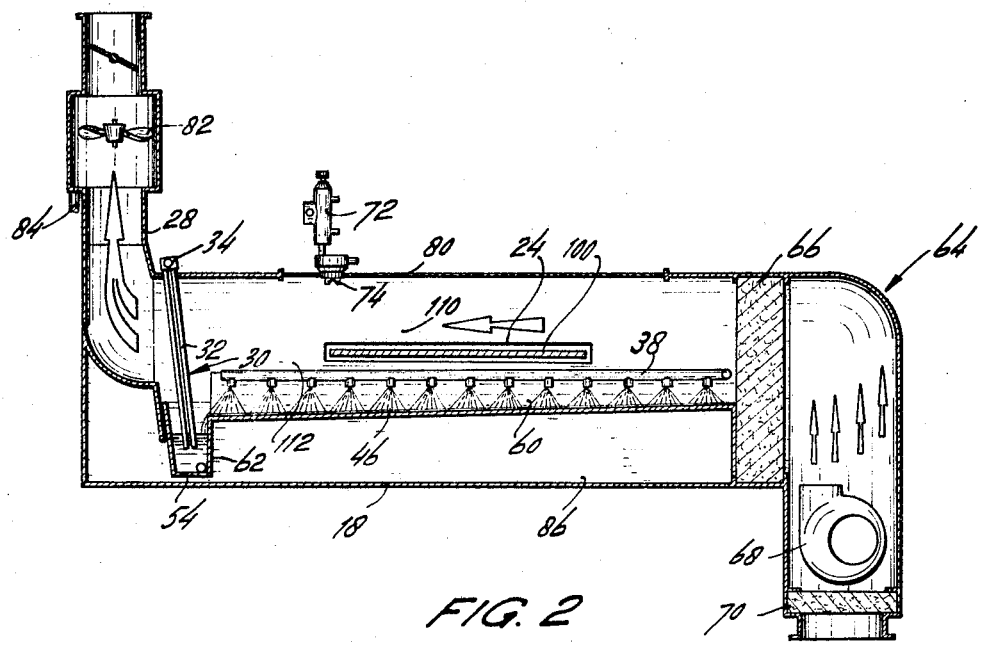

United States Patent Office 3,478,720
Patented Nov. 18, 1969

3,478,720
SEALED SPRAYER AND BAFFLE COMBINATION FOR A SPRAY-COATING ENVIRONMENT
Hendrik F. Bok, 819 Tucker Road,
North Dartmouth, Mass. 02747
Continuation-in-part of application Ser. No. 676,599, Oct. 19, 1967. This application Feb. 20, 1969, Ser. No. 801,028
Int. Cl. B05c *11/16, 5/02;* B05b *3/18*
U.S. Cl. 118—323
10 Claims

ABSTRACT OF THE DISCLOSURE

A combination sealed sprayer and staggered baffle for use in a laminar air flow spray-coating chamber, the baffle being adapted for flowing spray-coating solvent as a plurality of downwardly extending channels and the sprayer being sealed so as to avoid disturbing the laminar flow of filtered air through the chamber.

---

This application is a continuation-in-part of Method for Controlling a Spray-Coating Environment (Ser. No. 676,599), filed Oct. 19, 1967.

In the parent application there was disclosed the method for controlling the spray-coating environment or chamber by flowing of laminar air, sealing, while spraying and flowing of solvent horizontally in the bottom of the environment and vertically downward as a baffle at an end of the environment.

In the present application the claims are directed to the combination of the baffle structure for downward flowing of solvent and the sealed sprayer for positive sealing of the flowing laminar air within the environment.

BACKGROUND OF THE INVENTION

Field of the invention

Spray-coating, particularly spray-coating under laminar air flow conditions, wherein a liquid solvent for the spray-coating is circulated through the bottom, sides and an end of the environment, so as to absorb or precipitate out "bounce back" and "overspray" particles. The solvent and precipitated particles are recirculated as a spray-coating media.

DESCRIPTION OF THE PRIOR ART

Davis (2,155,932) shows a spray-coating environment characterized by the flow of a carrier gas as a conveyor for the substance to be coated upon an article, while maintaining the temperature of the carrier gas at ideal conditions and pressurizing and circulating the carrier gas to assure deposition of the particles in finely divided form.

Erickson (2,259,626) and Umbricht (2,981,525) teach the concept of horizontal flowing of solvent and vertical flowing of solvent, while flowing air perpendicular or transverse to the vertically flowing solvent. However, there is no suggestion of flowing vertically of the solvent through staggered channels nor sealing of the paint sprayer to provide positive flow of laminar air within the chamber.

McGraw (2,217,345) shows the flowing of solvent on all vertical walls downwardly in a spray-coating environment, but the environment is not sealed and laminar air is not employed.

Norris (2,848,353) teaches the flowing of solvent over the walls and floor of a spray booth and also the flowing of air through the booth. However, Norris does not show laminar air flow transverse to and through a vertical flow of solvent.

SUMMARY OF THE INVENTION

According to the present invention, the spray-coating environment is not controlled solely by the laminar-flow of filtered air. Rather, "overspray" and "bounce back" are absorbed by horizontally flowing a solvent liquid, through the bottom of the environment and vertically flowing solvent as a baffle transversely of flowing of said filtered air and at one end of said environment. This flowing solvent, being compatible with photo resist or the other medium being sprayed, literaly precipitates and dissolves the dry spray dust. The term "solvent" is used to designate any liquid which is compatible with the paint being sprayed to the extent that "overspray" and "bounce back" particles may be dissolved therein. For example in the spraying of a water-base paint, water may be flowed, as the solvent liquid.

By recirculating the solvent medium with dissolved spray dust, a spray-coating medium is developed which recovers virtually all of the spray dust and may be ultimately used as the spraying medium. Vertical flowing of the solvent is accomplished over a plurality of vertically upstanding, staggered channels through which the solvent is a gravity feed and behind which there is positioned an exhaust fan so as to draw the laminar-flow of filtered air through the baffle, enhancing the absorption of spray dust witthin the vertically flowing solvent. Spray dust which is not urged against the end baffle falls by gravity into a bottom pan of horizontally flowing solvent where it is recirculated with the solvent recovered at the end baffle.

A positive seal of the laminar air flow within the spray-coating environment is provided by extending the spray gun nozzle through an aperture in the top of the environment and sealing the aperture by means of a flexible seal extending from either end of the aperture to the spray gun nozzle as it reciprocates to and fro within the aperture.

BRIEF DESCRIPTION OF THE DRAWINGS

FIG. 2 is a longitudinal section of the spray-coating environment, illustrated in FIG. 1 and showing the system for circulating of the solvent horizontally through the bottom of the environment and vertically downward at one end of the environment with respect to the laminar flow of filtered air; and FIG. 3 is a transverse section of the spray-coating environment, illustrated in FIG. 2, and showing the bottom collection pan and end baffle flowing mediums, together with an air knife which may be employed at the entry and exit portals of the environment.

DESCRIPTION OF THE PREFERRED EMBODIMENTS

Figure 1:
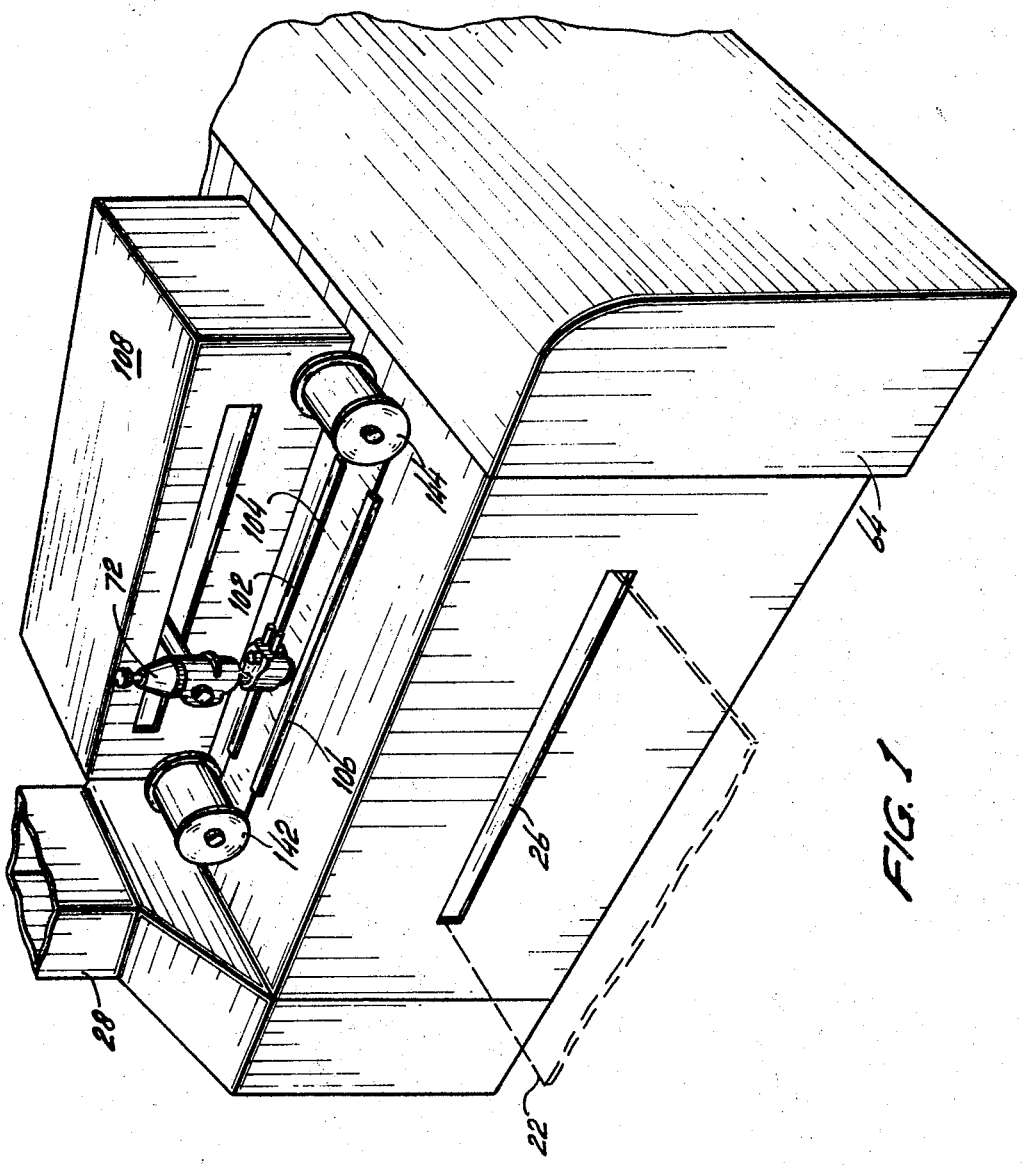
FIG. 1 is a fragmentary perspective of a spray-coating chamber with the spray gun reciprocably mounted on top thereof.

In FIG. 2 the bottom pan 60 and end baffle 30 arrangements are shown with respect to conventional spray gun 72, having nozzle 74 which is reciprocated transversely of the conveyance line through top portal 80. In blower-filter unit 64 laminar-flow air is developed by squirrel cage or similar blower 68 pre-filtered at 70 and final filtered with a .3 micron filter 66 to supply a quantity of filtered air sufficient to develop 120–180 linear feet per minute of laminar air movement through the spray-coating environment. A positive over-pressure in the spray-coating environment may be developed by regulating exhaust fan 82 within exhaust duct 28 to draw air at a slightly lower speed.

In FIG. 3 there is illustrated the positioning of bottom pan 60 and end baffle 30 with respect to an air knife pressurizing chamber 86, for which the filtered air is developed through filter 66. Filtered air is forced from chamber 86 as air knife blade seals 88 and 90 across entry portal 26 and exit portal 24 both being substantially shielded by upper hood 96 and lower hood 98. Air knife seals 88 and 90 may be directed and recovered by a slotted suction tubes 94 and 92, suction being developed through the conduit 84 shown fragmentarily in FIG. 3, as communicating with exit fan 82.

The automatic spray gun 72, as well as conventional traversing mechanism 108, may be positioned medially of a self-coiling thin stainless steel spring 102 secured at either end to rollers 142 and 144 and guided over top portal 80 on either side by Teflon or like tracks 104 and 106. Thus, as the automatic gun reciprocates transversely across the top portal 80, a positive seal is provided so as to avoid disturbing the laminar-flow of filtered air within the spray-coating environment.

Manifestly, the configuration of the staggered channels in the end wall baffle, the means of reciprocating as well as sealing the spray gun extending through the top aperture may be varied without departing from the spirit of the invention.

I claim:
1. A sealed sprayer and baffle for a spray-coating environment comprising:
(A) a spray-coating chamber having:
(i) a laminar air flow source mounted at one end;
(ii) an exhaust duct mounted at the other end;
(iii) conveyor entry and exit portals on either side of said chamber intermediate said laminar air flow source and said exhaust duct; and
(iv) a spraying aperture in the top of said chamber;
(B) an end wall baffle mounted adjacent said exhaust duct within said chamber and consisting of:
(i) a plurality of vertically disposed longitudinally staggered, channels; and
(ii) a liquid feeding conduit communicant with said channels, so as to feed liquid for downward flow upon said channels; and
(C) a spray gun reciprocably mounted upon said chamber so that its nozzle extends through said aperture and including:
(i) a flexible seal extending from either end of said aperture to said spray nozzle.
2. A sealed sprayer and baffle combination as in claim 1, said spray gun being mounted upon a self-coiling spring rotatably secured at both ends of said aperture.

3. A sealed sprayer and baffle combination as in claim 2, including longitudinal guides supported at either side of said aperture and overriding the edges of said coiled spring, so as to secure said spring in sealed relationship with said spray-coating chamber.

4. A sealed sprayer and baffle as in claim 3, said seal being a self-coiling, thin steel spring secured at either end of the aperture by rollers and guided over the top aperture by Teflon or like plastic tracks, so as to provide a positive air seal within the spray-coating chamber.

5. A sealed sprayer and baffle as in claim 4, including a liquid collection pan mounted in said chamber beneath said channels and said liquid feeding conduit, having a pump, and extending from said collection pan to the top of said channels.

6. A sealed sprayer and baffle as in claim 5, including a bottom collection pan supported at the bottom of said spray-coating chamber intermediate said source of laminar air flow and said end wall baffle and having a horizontal liquid flowing conduit with nozzles extending around the periphery of the pan.

7. A sealed sprayer and baffle as in claim 6, said bottom collection pan being inclined and engaging said channel collection pan, so that liquid falls as a waterfall from said bottom pan to said collection pan.

8. A sealed sprayer and baffle as in claim 7, said staggered end wall channels extending into said collection pan vertically beneath said bottom flowing pan.

9. A sealed sprayer and baffle as in claim 8, including a filter mounted in said liquid feeding conduit intermediate said pump and said hood.

10. A sealed sprayer and baffle as in claim 9, said channels having a substantially flat back surface with outwardly inclined flanges on either side, so as to laterally contain liquid flowing downwardly therein.

References Cited

UNITED STATES PATENTS

| | | | |
|---|---|---|---|
| 2,486,251 | 10/1949 | Braun | 98—115 |
| 2,694,466 | 11/1954 | Bingman | 118—326 X |
| 3,123,455 | 3/1964 | Paasche | 55—241 X |

WALTER A. SCHEEL, Primary Examiner

JOHN P. McINTOSH, Assistant Examiner

U.S. Cl. X.R.

118—326